US008541518B2

(12) United States Patent
Albrecht et al.

(10) Patent No.: US 8,541,518 B2
(45) Date of Patent: *Sep. 24, 2013

(54) SEMI CONTINUOUS OPERATIONAL METHOD FOR PRODUCING COPOLYMERS

(75) Inventors: Gerhard Albrecht, Prien am Chiemsee (DE); Klaus Lorenz, Zangberg (DE); Christian Scholz, Wald an der Alz (DE); Petra Wagner, Trostberg (DE)

(73) Assignee: Construction Research & Technology GmbH, Trostberg (DE)

( * ) Notice: Subject to any disclaimer, the term of this patent is extended or adjusted under 35 U.S.C. 154(b) by 125 days.

This patent is subject to a terminal disclaimer.

(21) Appl. No.: 12/920,143

(22) PCT Filed: Feb. 10, 2009

(86) PCT No.: PCT/EP2009/051481
§ 371 (c)(1),
(2), (4) Date: Sep. 29, 2010

(87) PCT Pub. No.: WO2009/115371
PCT Pub. Date: Sep. 24, 2009

(65) Prior Publication Data
US 2011/0009575 A1    Jan. 13, 2011

(30) Foreign Application Priority Data
Mar. 19, 2008    (EP) .................................. 08102758

(51) Int. Cl.
*C08F 2/04*    (2006.01)
*C08F 224/00*    (2006.01)
*C08F 2/10*    (2006.01)
*C04B 28/28*    (2006.01)

(52) U.S. Cl.
USPC .............. 526/60; 526/271; 526/317.1; 524/5; 524/4

(58) Field of Classification Search
USPC ............................ 526/317.1, 60, 271; 524/5
See application file for complete search history.

(56) References Cited

U.S. PATENT DOCUMENTS

| 7,691,921 B2 | 4/2010 | Asano et al. | |
|---|---|---|---|
| 2006/0183820 A1* | 8/2006 | Asano et al. | 524/5 |
| 2007/0161724 A1* | 7/2007 | Moraru et al. | 524/59 |
| 2009/0163622 A1 | 6/2009 | Albrecht et al. | |

FOREIGN PATENT DOCUMENTS

| DE | 10 2005 061 153 A1 | 6/2007 |
|---|---|---|
| EP | 1 690 677 A1 | 8/2006 |
| WO | WO 2005/075529 A2 | 8/2005 |

OTHER PUBLICATIONS

PCT/EP2009/051481—Written Opinion of the International Searching Authority. Mar. 19, 2009.
PCT/EP2009/051481—International Search Report. Mar. 19, 2009.

* cited by examiner

*Primary Examiner* — Michael Bernshteyn
(74) *Attorney, Agent, or Firm* — Curatolo Sidoti Co., LPA; Joseph G. Curratolo; Salvatore A. Sidoti

(57) ABSTRACT

A process for the preparation of a copolymer in a semicontinuous mode of operation in a polymerization apparatus containing a polymerization reactor connected to a metering device, in each case acid monomer being initially introduced into the metering device and polyether macromonomer and water into the polymerization reactor, acid monomer being metered from the metering device into the polymerization reactor, the metering of the acid monomer into the polymerization reactor being effected in such a way that first a polymerization pH is established in the aqueous medium and then, until the conversion of 70 mol % of the polyether macromonomer initially introduced into the polymerization reactor, acid monomer is passed into the polymerization reactor in an amount per unit time such that the pH in the aqueous medium deviates by not more than ±0.3 from the initially established polymerization pH.

25 Claims, No Drawings

SEMI CONTINUOUS OPERATIONAL METHOD FOR PRODUCING COPOLYMERS

CROSS REFERENCE TO RELATED APPLICATIONS

This application is a national stage application of International Application No. PCT/EP2009/051481, filed 10 Feb. 2009, which claims priority from European Patent Application Serial No. 08 102 758.3. filed 19 Mar. 2008, from which applications priority is claimed, and which are incorporated herein by reference.

The present invention relates to a process for the preparation of a copolymer, the copolymer and the use of the copolymer.

It is known that admixtures in the form of dispersants are often added to aqueous slurries of pulverulent inorganic or organic substances, such as clays, silicate powder, chalk, carbon black, crushed rock and hydraulic binders, in order to improve their processability. i.e. kneadability, spreadability, sprayability, pumpability or flowability. Such admixtures are capable of breaking up solid agglomerates, dispersing the particles formed and in this way improving the processability. This effect is also utilized in a targeted manner in the preparation of building material mixtures which contain hydraulic binders, such as cement, lime, gypsum or anhydrite.

In order to convert these building material mixtures based on said binders into a ready-to-use, processable form, as a rule substantially more mixing water is required than would be necessary for the subsequent hydration or hardening process. The proportion of cavities formed by the excess, subsequently evaporating water in the concrete body leads to significantly poorer mechanical strengths and stabilities.

In order to reduce this excess proportion of water at a predetermined processing consistency and/or to improve the processability at a predetermined water/binder ratio, admixtures, which are generally referred to as water-reducing agents or super plasticizers, are used. In particular, copolymers which are prepared by free radical copolymerization of acid monomers with polyether macromonomers are used in practice as such compositions.

In practice, the copolymerization is generally effected by the semi-batch procedure. WO 2005/075529 describes a semicontinuous preparation process for said copolymers, in which the polyether macromonomer is initially introduced and the acid monomer is then metered into the initially introduced substance over lime. Although the process described is already economical and high-performance superplasticizers are obtained as a product of the process, efforts are still being made further to improve the quality of the product of the process and to do so as far as possible without adversely affecting the cost-efficiency of the process to a substantial extent.

It is therefore an object of the present invention to provide an economical process for the preparation of copolymers which show good performance as dispersants for hydraulic binders, especially as superplasticizers/water-reducing agents.

This object is achieved by a process for the preparation of a copolymer in a semicontinuous mode of operation in a polymerization apparatus containing a polymerization reactor connected to a metering device, in each case acid monomer being initially introduced into the metering device and polyether macromonomer and water into the polymerization reactor, acid monomer being metered from the metering device into the polymerization reactor, free radical polymerization initiator being passed into the polymerization reactor before and/or during the metering of the acid monomer into the polymerization reactor, so that an aqueous medium forms in the polymerization reactor, in which aqueous medium acid monomer and polyether macromonomer are reacted by free radical polymerization with formation of the copolymer, at least 70 mol % of the polyether macromonomer initially introduced into the polymerization reactor being converted by the free radical polymerization, the conversion of the acid monomer giving rise in the copolymer to an acid structural unit which reduces the pH of the aqueous medium to a lesser extent than the acid monomer as such, the metering of the acid monomer into the polymerization reactor being effected in such a way that first a polymerization pH is established in the aqueous medium and then, until the conversion of 70 mol % of the polyether macromonomer initially introduced into the polymerization reactor, acid monomer is passed into the polymerization reactor in an amount per unit time such that the pH in the aqueous medium deviates by not more than ±0.3 from the initially established polymerization pH.

Acid monomer is to be understood as meaning monomers which are capable of free radical polymerization, have at least one carbon double bond, contain at least one acid function and react as an acid in the aqueous medium. Furthermore, acid monomer is also to be understood as meaning monomers capable of free radical polymerization, having at least one carbon double bond and, owing to the hydrolysis reaction in the aqueous medium, forming at least one acid function and reacting as an acid in the aqueous medium (example: maleic anhydride). In the context of the present invention, polyether macromonomers are compounds capable of free radical polymerization and having at least one carbon double bond and at least two ether oxygen atoms, with the proviso that the polyether macromonomer structural units present in the copolymer have side chains which contain at least two ether oxygen atoms.

It is not necessary initially to introduce all polyether macromonomer reacted by free radical polymerization in the polymerization reactor into the polymerization reactor before the acid monomer is metered in. However, preferably at least 50 mol %, particularly preferably at least 80 mol % and in many cases about 100% of the polyether macromonomer structural units are incorporated into the copolymer by reaction of polyether macromonomer which is initially introduced into the polymerization reactor before the acid monomer is metered in. The (usually) not more than 50 mol %, preferably (usually) not more than 20 mol % of the polyether macromonomer then optionally remaining are as a rule fed continuously to the polymerization reactor while the acid monomer has been metered in. Polyether macromonomer can be fed to the polymerization reactor separately from the acid monomer (cf. Synthesis example 4 below) and/or as a mixture with the acid monomer (by, for example, also initially introducing polyether macromonomer in addition to the acid monomer into the metering device).

The circumstance that the conversion of the acid monomer into the copolymer results in the formation of an acid structural unit which reduces the pH of the aqueous medium to a lesser extent than the acid monomer as such means that the acid monomer has a higher acid strength than the corresponding acid structural unit in the copolymer (this situation occurs in the case of most acid monomers/acid monomer structural units).

The metering device may have various forms and can be manually and/or automatically controlled. In the case of manual control, for example, a person can read the relevant pH continuously on a pH meter which has been set up and can accordingly continuously meter in the acid monomer from a container. Automatic control can couple the feed rate of the acid monomer (preferably continuously) directly with the corresponding pH measuring signal.

A substantial advantage of the process according to the invention is that, owing to the special metering, it is possible to prepare strictly uniform copolymers—and to do so with respect to molecular weight (low dispersion index of the molecular weight distribution) and with regard to the relative proportion of the monomer structural units in the copolymer (chemical uniformity). This uniformity of the copolymer results in the end in particularly good suitability as a superplasticizer for hydraulic binders. The process according to the invention can also be regarded as being economical (a good effect is achieved with only little metering effort—"high metering efficiency").

In a preferred embodiment of the invention, the reaction of the acid monomer produces a structural unit in the copolymer, which unit is according to one of the general formulae (Ia), (Ib), (Ic) and/or (Id)

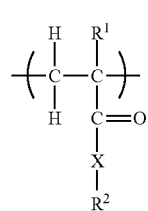

(Ia)

where
$R^1$ is identical or different and is represented by H and/or a straight-chain or branched $C_1$-$C_4$ alkyl group;
X is identical or different and is represented by NH—($C_nH_{2n}$) where n=1, 2, 3 or 4 and/or O—($C_nH_{2n}$) where n=1, 2, 3 or 4 and/or by a unit not present;
$R^2$ is identical or different and is represented by OH, $SO_3H$, $PO_3H_2$, O—$PO_3H_2$ and/or para-substituted $C_6H_4$—$SO_3H$, with the proviso that, if X is a unit not present, $R^2$ is represented by OH;

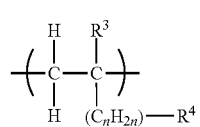

(Ib)

where
$R^3$ is identical or different and is represented by H and/or a straight-chain or branched $C_1$-$C_4$ alkyl group;
n=0, 1, 2, 3 or 4;
$R^4$ is identical or different and is represented by $SO_3H$, $PO_3H_2$, O—$PO_3H_2$ and/or $C_6H_4$—$SO_3H$ present in para-substituted form;

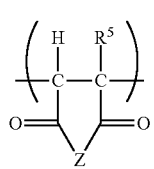

(Ic)

where
$R^5$ is identical or different and is represented by H and/or a straight-chain or branched $C_1$-$C_4$ alkyl group;
Z is identical or different and is represented by O and/or NH;

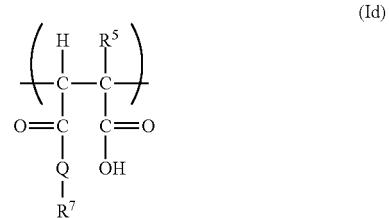

(Id)

where
$R^6$ is identical or different and is represented by H and/or a straight-chain or branched $C_1$-$C_4$ alkyl group;
Q is identical or different and is represented by NH and/or O;
$R^7$ is identical or different and is represented by H, ($C_nH_{2n}$)—$SO_3H$ where n=0, 1, 2, 3 or 4, ($C_nH_{2n}$)—OH where n=0, 1, 2, 3 or 4; ($C_nH_{2n}$)—$PO_3H_2$ where n=0, 1, 2, 3 or 4. ($C_nH_{2n}$)—$OPO_3H_2$ where n=0, 1, 2, 3 or 4, ($C_6H_4$)—$SO_3H$, ($C_6H_4$)—$PO_3H_2$, ($C_6H_4$)—$OPO_3H_2$ and/or ($C_mH_{2m}$)$_e$—O—(A'O)$_\alpha$—$R^9$ where m=0, 1, 2, 3 or 4, e=0, 1, 2, 3 or 4, A'=C,—$H_{2x'}$ where x'=2, 3, 4 or 5 and/or $CH_2C(C_6H_5)H$—, $\alpha$=an integer from 1 to 350 with $R^9$ identical or different and represented by a straight-chain or branched $C_1$-$C_4$ alkyl group.

It should be mentioned that acid functions in the copolymer which are presented above may be present at least partly in neutralized form.

Methacrylic acid, acrylic acid, maleic acid, maleic anhydride, a monoester of maleic acid or a mixture of a plurality of these components is used as the acid monomer.

In a preferred embodiment, the reaction of the polyether macromonomer produces in the copolymer a structural unit which is according to one of the general formulae (IIa), (IIb) and/or (IIc)

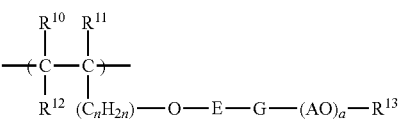

(IIa)

where
$R^{10}$, $R^{11}$ and $R^{12}$ are in each case identical or different and, independently of one another, are represented by H and/or a straight-chain or branched $C_1$-$C_4$ alkyl group;
E is identical or different and is represented by a straight-chain or branched $C_1$-$C_6$ alkylene group, a cyclohexyl group, $CH_2$—$C_6H_{10}$, $_{c6}H_4$ present in the ortho-, meta- or para-substituted form and/or a unit not present;
G is identical or different and is represented by O, NH and/or CO—NH, with the proviso that, if E is a unit not present, G is also present as a unit not present; and
A is identical or different and is represented by $C_xH_{2x}$ where x=2, 3, 4 and/or 5 (preferably x=2) and/or $CH_2CH$($C_6H_5$);

n is identical or different and is represented by 0, 1, 2, 3, 4 and/or 5;

a is identical or different and is represented by an integer from 2 to 350 (preferably 10-200);

$R^{13}$ is identical or different and is represented by H, a straight-chain or branched $C_1$-$C_4$ alkyl group, CO—$NH_2$, and/or $COCH_3$;

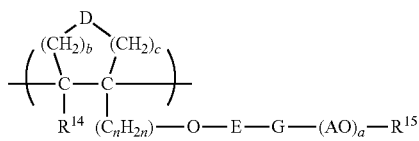

(IIb)

where $R^{14}$ is identical or different and is represented by H and/or a straight-chain or branched $C_1$-$C_4$ alkyl group;

E is identical or different and is represented by a straight-chain or branched $C_1$-$C_6$ alkylene group, a cyclohexyl group, $CH_2$—$C_6H_{10}$, $C_6H_4$ present in ortho-, meta- or para-substituted form and/or by a unit not present;

G is identical or different and is represented by a unit not present, or O, NH and/or CO—NH, with the proviso that, if E is a unit not present, G is also present as a unit not present;

A is identical or different and is represented by $C_xH_{2x}$ where x=2, 3, 4 and/or 5 and/or $CH_2CH(C_6H_5)$;

n is identical or different and is represented by 0, 1, 2, 3, 4 and/or 5;

a is identical or different and is represented by an integer from 2 to 350;

D is identical or different and is represented by a unit not present, NH and/or O, with the proviso that, if D is a unit not present: b=0, 1, 2, 3 or 4 and c=0, 1, 2, 3 or 4, where b+c=3 or 4, and with the proviso that, if D is NH and/or O: b=0, 1, 2 or 3, c=0, 1, 2 or 3, where b+c=2 or 3;

$R^{15}$ is identical or different and is represented by H, a straight-chain or branched $C_1$-$C_4$ alkyl group, CO—$NH_2$, and/or $COCH_3$;

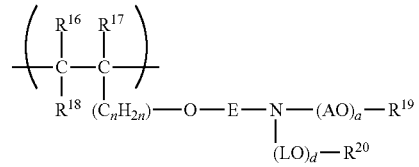

(IIc)

where $R^{16}$, $R^{17}$ and $R^{18}$ are in each case identical or different and, independently of one another, are represented by H and/or a straight-chain or branched $C_1$-$C_4$ alkyl group;

E is identical or different and is represented by a straight-chain or branched $C_1$-$C_6$ alkylene group, a cyclohexyl group, $CH_2$—$C_6H_{10}$, $C_6H_4$ present in ortho-, meta- or para-substituted form and/or by a unit not present;

A is identical or different and is represented by $C_xH_{2x}$ where x=2, 3, 4 and/or 5 and/or $CH_2CH(C_6H_5)$;

n is identical or different and is represented by 0, 1, 2, 3, 4 and/or 5;

L is identical or different and is represented by $C_xH_{2x}$ where x=2, 3, 4 and/or 5 and/or $CH_2$—$CH(C_6H_5)$;

a is identical or different and is represented by an integer from 2 to 350;

d is identical or different and is represented by an integer from 1 to 350;

$R^{19}$ is identical or different and is represented by H and/or a straight-chain or branched $C_1$-$C_4$ alkyl group, $R^{20}$ is identical or different and is represented by H and/or a straight-chain $C_1$-$C_4$ alkyl group.

A preferably used polyether macromonomer is alkoxylated isoprenol and/or alkoxylated hydroxybutyl vinyl ether and/or alkoxylated (meth)allyl alcohol and/or vinylated methylpolyalkylene glycol having preferably in each case an arithmetic mean number of oxyalkylene groups of 4 to 340.

In addition to the acid monomer and the polyether macromonomer, further monomer types may also be used. These are then reacted as a rule so that in practice a vinylically unsaturated compound is passed into the polymerization reactor as monomeric starting material, which compound is reacted by polymerization and thereby produces in the copolymer a structural unit which is present according to the general formula (IIIa) and/or (IIIb)

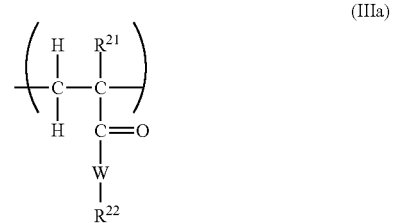

(IIIa)

where $R^{21}$ is identical or different and is represented by H and/or a straight-chain or branched $C_1$-$C_4$ alkyl group (preferably H or $CH_3$);

W is identical or different and is represented by O and/or NH;

$R^{22}$ is identical or different and is represented by a branched or straight-chain $C_1$-$C_5$-monohydroxyalkyl group ($C_1$, $C_2$, $C_3$, $C_4$ or $C_5$ is in each case typical but $C_2$ and/or $C_3$ is preferred);

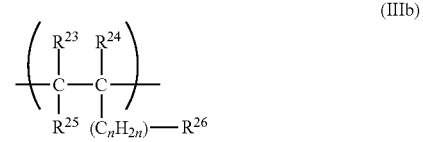

(IIIb)

where $R^{23}$, $R^{24}$ and $R^{25}$ are in each case identical or different and, in each case independently, are represented by H and/or a straight-chain or branched $C_1$-$C_4$ alkyl group (preferably H and/or $CH_3$);

n is identical or different and is represented by 0, 1, 2, 3 and/or 4;

$R^{26}$ is identical or different and is represented by ($C_6H_5$), OH and/or —$COCH_3$.

Typical monomers which produce the structural units (IIIa) or (IIIb) by polymerization are, for example, 2-hydroxypropyl acrylate, isoprenol or allyl alcohol. In this context, hydroxybutyl vinyl ether could also be mentioned as a further typical monomer.

Usually, altogether at least 45 mol %, but preferably at least 80 mol %, of all structural units of the copolymer are produced by free radical polymerization of acid monomer and polyether macromonomer.

In a preferred embodiment, polyether macromonomer is initially introduced into the polymerization reactor in an amount per mole of acid monomer metered in such that an arithmetic mean molar ratio of acid monomer structural units to polyether macromonomer of 20:1 to 1:1, preferably of 12:1 to 1:1, is established in the copolymer formed.

As a rule, a redox initiator is used as the free radical polymerization initiator. In general, the system $H_2O_2/FeSO_4$ is then chosen as the redox initiator, preferably together with a reducing agent. Sodium sulphite, the disodium salt of 2-hydroxy-2-sulphinatoacetic acid, disodium salt of 2-hydroxy-2-sulphonatoacetic acid, sodium hydroxymethanesulphinate, ascorbic acid, isoascorbic acid or mixtures thereof are suitable as reducing agents. Other systems are also suitable as the redox initiator system, for example those which are based on tert-butyl hydroperoxide, ammonium peroxodisulphate or potassium peroxodisulphate.

In one embodiment, initiator components, e.g. $H_2O_2$, and the polyether macromonomer are passed simultaneously in premixed form (preferably in one stream) into the polymerization reactor.

In principle, however, all compounds decomposing into free radicals under polymerization conditions can be used as initiators, such as, for example, peroxides, hydroperoxides, persulphates, azo compounds and perphosphates. When the free radical formers are combined with suitable reducing agents, known redox systems or redox catalysts are obtained. Suitable reducing agents are, for example, sodium sulphite, the disodium salt of 2-hydroxy-2-sulphonatoacetic acid, the disodium salt of 2-hydroxy-2-sulphinatoacetic acid, sodium hydroxymethanesulphinate, ascorbic acid, iso-ascorbic acid, amines, such as diethanolamine or triethanolamine, hydroxylamine or mixtures thereof. Expediently, water-soluble salts of transition metals, such as iron, cobalt, nickel or silver, are additionally employed with the use of redox systems or catalysts, iron salts (present predominantly in divalent form) preferably being used here.

In general, a component of the redox initiator system and/or reducing agent is passed into the polymerization reactor after the polymerization pH has been established and during the metering in of the acid monomer.

As a rule, the polymerization pH in the aqueous medium is established so that, with regard to the free radical polymerization initiator used, the free radical formation per unit time (free radical yield) is high, preferably approximately maximum. The polymerization initiator used or the polymerization initiator system used thus so to speak usually approximately already predetermines the polymerization pH. Typically, the aqueous medium is present in the form of an aqueous solution.

Usually, the polymerization reactor is present as a semicontinuous stirred tank.

Frequently, at least 80 mol %, preferably at least 90 mol %, of the polyether macromonomer initially introduced into the polymerization reactor is converted by the free radical polymerization.

As a rule, a conversion of 70 mol % of the polyether macromonomer initially introduced into the polymerization reactor, acid monomer is passed into the polymerization reactor in an amount per unit time such that the pH in the aqueous medium deviates by not more than ±0.2, preferably not more than ±0.1 (ideally not at all) from the initially established polymerization pH.

In general, at least 80 mol % of the polyether macromonomer initially introduced into the polymerization reactor is converted by the free radical polymerization and, until conversion of 80 mol % of the polyether macromonomer initially introduced into the polymerization reactor, acid monomer is passed into the polymerization reactor in an amount per unit time such that the pH in the aqueous medium deviates by not more than ±0.3 from the initially established polymerization pH.

Usually, the polymerization pH is 4.0 to 7.0, preferably 4.5 to 6.5 and particularly preferably 4.8 to 6.0 and the temperature of the aqueous medium during the free radical polymerization is 0 to 90° C., preferably 10 to 35° C.

Preferably, the acid monomer is initially introduced together with water into the metering unit and an aqueous solution of the acid monomer is metered from the metering unit into the polymerization reactor, it being possible for a portion of the acid monomer to be converted by the addition of base into the corresponding acid monomer salt before being metered into the polymerization reactor. Such a partial neutralization of the acid monomer effected beforehand can be used in addition to the metering rate as a further control parameter for regulating the pH in the aqueous medium.

As a rule, the polymerization pH in the aqueous medium is established by metering the acid monomer into the polymerization reactor and optionally by adding a base to the polymerization reactor and/or to the metering device so that acid monomer and/or acid monomer salt may be present in the polymerization reactor even before the polymerization pH is established.

In general, a chain regulator, which is preferably present in dissolved form, is passed into the polymerization reactor.

The invention also relates to a copolymer which can be prepared by the process described above. The copolymer according to the invention is usually present as a comb polymer.

The invention furthermore relates to the use of the copolymer according to the invention as a dispersant for hydraulic binders or for latent hydraulic binders.

Below, the invention is to be described in more detail with reference to working examples.

SYNTHESIS EXAMPLES AND COMPARATIVE EXAMPLES

Synthesis Example 1

200 g of demineralized water and 225 g (0.075 mol) of vinyloxybutyl polyethylene glycol-3000 (adduct of 65 mol of ethylene oxide with hydroxybutyl monovinyl ether having an average molecular weight of 3000 g/mol) were initially introduced into a glass reactor equipped with a stirrer, pH electrode and a plurality of feed devices and were cooled to a polymerization starting temperature of 15° C. (initially introduced mixture).

16.2 g (0.2025 mol) of acrylic acid were homogeneously mixed with 42 g of demineralized water in a separate feed vessel. The solution was adjusted, with cooling, to a temperature of 20° C. and a pH of 4.0 with 7.7 g of a 40% strength potassium hydroxide solution. 0.7 g of 3-mercaptopropionic acid was then added as a molecular weight regulator (solution A).

At the same time, a second solution consisting of 1.5 g of Brüggolit FF6 (from Brüggemann GmbH) and 23.5 g of water was prepared (solution B).

23.3 g of solution A and then 1.8 g of a 20% strength aqueous sodium hydroxide solution were added to the initially introduced mixture with stirring and cooling so that a pH of 5.8 resulted.

After this pH had been reached, 0.015 g of iron(II) sulphate heptahydrate, 0.1 g of solution B and 0.94 g of hydrogen peroxide (30% in water) were added in succession to the initially introduced mixture. At the same time, the addition of solution A and solution B to the stirred and initially introduced mixture was started.

The feed rate of solution A was modified here according to the following metering profile so that the pH in the initially introduced mixture over the entire period of addition of 45 minutes was kept constant at a value of 5.8 +/−0.1:

| t (min) | 0 | 1.5 | 3 | 6 | 9 | 12 | 15 | 18 | 21 | 24 | 27 | 30 | 33 | 36 | 39 | 45 |
|---|---|---|---|---|---|---|---|---|---|---|---|---|---|---|---|---|
| Solution A (g/h) | 29 | 59 | 103 | 123 | 115 | 103 | 88 | 71 | 56 | 44 | 35 | 26 | 21 | 15 | 13 | 0 |

Solution B was added simultaneously over the same period of 45 minutes at a metering rate of 7 g/h. Thereafter, the metering rate of solution B was increased to 50 g/h and pumped into the initially introduced mixture over a period of 10 minutes with stirring. After complete addition of solutions A and B, peroxide was no longer found in the reaction vessel.

The polymer solution obtained was then adjusted to a pH of 6.5 with about 10 g of a 20% strength sodium hydroxide solution.

The copolymer obtained occurred as slightly yellow solution which had a solids content of 46.5%. The average molecular weight of the copolymer was Mw 63000 g/mol; Mp 48000 g/mol; residual PEG: 11%; polydispersity 1.63.

Comparative Example 1-1

Example 1 was repeated with the difference that only 1.2 g of 20% NaOH was required for establishing the pH of 5.8 in the initially introduced mixture and the metering of solution A was effected at a constant rate of 58 g/h over a period of 45 minutes. First, an increase of the pH to a maximum value of 6.2 after 12 minutes was observed and, in the further course of the addition of solution A, a reduction at the end of the addition to 5.8. The solids content of the copolymer solution obtained was 47%. The average molecular weight was Mw 66000 g/mol or Mp 47000 g/mol with a residual proportion of PEG of 14% and a polydispersity of 1.78.

Comparative Example 1-2

Synthesis example 1 was repeated analogously to Comparative example 1-1 with a linear metering rate of solution A. However, the increase of the pH in the polymerization mixture which was observed in the first 12 minutes of the addition of A was corrected by addition of 25% strength sulphuric acid, and the decrease of the pH observed from 13 minutes was corrected by addition of 20% strength aqueous sodium hydroxide solution, so that the measured pH in the reactor could be kept constant at 5.8 +/−0.1.

Synthesis Example 2

The procedure was as in Synthesis example 1, but the 3-mercaptopropionic acid was added separately and the following monomer combination was used:

Initially Introduced Mixture:

| | |
|---|---|
| Vinyloxybutylpolyethylene glycol-1100: | 85.8 g (0.078 mol) |
| Vinyloxybutylpolyethylene glycol-5800: | 127.6 g (0.022 mol) |
| in demineralized water: | 210.0 g |

Solution A:

| | |
|---|---|
| Maleic anhydride: | 7.8 g (0.08 mol) |
| Acrylic acid: | 2.9 g (0.04 mol) |
| Hydroxypropyl acrylate: | 10.4 g (0.08 mol) |
| Hydroxyethyl acrylate: | 4.6 g (0.04 mol) |
| Potassium hydroxide solution (40% in water): | 12.5 g |
| in demineralized water | 76.5 g |

40.5 g of solution A, 0.3 g of solution B and 0.5 g of 3-mercaptopropionic acid were added to the initially introduced mixture with stirring and cooling so that a pH of 5.8 resulted.

1.9 g of 3-mercaptopropionic acid were then added to the remaining solution. The following metering profile was used over the period of addition of 30 minutes, it having been possible to maintain a constant pH of 5.6 +/−0.2 in the polymerization mixture:

| t (min) | 0 | 2 | 4 | 8 | 10 | 12 | 14 | 16 | 18 | 22 | 26 | 30 |
|---|---|---|---|---|---|---|---|---|---|---|---|---|
| Solution A (g/h) | 225 | 250 | 261 | 250 | 225 | 184 | 151 | 121 | 93 | 58 | 36 | 0 |

Solution B was pumped into the initially introduced mixture over said period of 30 minutes simultaneously at a constant metering rate of 15 g/h and then at a metering rate of 50 g/h over a further period of 10 minutes with stirring. After complete addition of solutions A and B, peroxide was no longer detectable in the reaction vessel.

The copolymer obtained occurred in slightly yellowish solution which had a solids content of 44%. The average molecular weight of the copolymer was Mw 31000 g/mol or 28000 g/mol. 3.8% residual monomer (PEG) were found. The polydispersity of the copolymer was 1.53.

Comparative Example 2-1

Example 2 was repeated but the metering of solution A was carried out at a constant rate of 108 g/h over a period of 45 minutes. Here, first an increase of the pH to a maximum value of 5.9 after 4 minutes and, in the further course of the addition of solution A, a reduction to 5.4 up to the end of the addition were observed.

Solids content of the copolymer solution obtained: 44%
Average molecular weight: Mw 33000 g/mol; Mp 30000 g/mol;
Residual PEG: 4.4%;
Polydispersity: 1.57

Comparative Example 2-2

Synthesis example 2 was repeated analogously to Comparative example 2-1 with a linear metering rate of solution A. However, the increase of pH in the polymerization mixture which was observed in the first 4 minutes of the addition of A was corrected by addition of 25% strength sulphuric acid, and the decrease of the pH observed from 4.5 minutes onwards was corrected by addition of 20% strength sodium hydroxide solution, so that the measured pH in the reactor could be kept constant at 5.8.

Synthesis Example 3

The procedure was as described in Synthesis example 1 but the following monomer combination was used:
Initially Introduced Mixture:

| | |
|---|---|
| Isoprenoloxybutylpolyethylene glycol-500: | 37.5 g (0.075 mol) |
| Isoprenoloxybutylpolyethylene glycol-1100: | 82.5 g (0.075 mol) |
| in demineralized water: | 87.0 g |

Solution A

| | |
|---|---|
| Acrylic acid: | 16.2 g (0.225 mol) |
| Hydroxypropyl acrylate: | 5.9 g (0.045 mol) |
| Potassium hydroxide solution (40% in water): | 12.5 g |
| in demineralized water | 49.5 g |

Solution B

| | |
|---|---|
| Brüggolit E01: | 1.5 g |
| in demineralized water | 23.5 g |

29.0 g of solution A, 0.5 g of solution B and 1.05 g of 3-mercaptopropionic acid were added to the initially introduced mixture with stirring and cooling so that a pH of 5.1 resulted.

0.9 g of 3-mercaptopropionic acid was then added to the remaining solution A. The following metering profile was used over the period of 45 minutes, it having been possible to maintain a constant pH of 5.1-5.2 in the polymerization mixture:

| t (min) | 0 | 1.5 | 3 | 6 | 9 | 12 | 15 | 18 | 21 | 24 | 27 | 30 | 33 | 36 | 39 | 45 |
|---|---|---|---|---|---|---|---|---|---|---|---|---|---|---|---|---|
| Solution A (g/h) | 37 | 74 | 130 | 155 | 144 | 130 | 111 | 89 | 70 | 55 | 44 | 33 | 27 | 19 | 16 | 0 |

The copolymer obtained occurred as a slightly yellowish solution which had a solids content of 43%. Average molecular weight: Mw 25000 g/mol; Mp 20000 g/mol; residual PEG: 6.5%; polydispersity: 1.64.

The polymer solution obtained was then adjusted to a pH of 6.5 with about 28 g of a 20% strength aqueous sodium hydroxide solution.

Comparative Example 3-1

Example 3 was repeated but the metering solution A was effected at a constant rate of 62 g/h over a period of 45 minutes. Here, first an increase of the pH to a maximum value of 5.1 after 5.4 minutes and, in the further course of the addition of solution A, a reduction to 5.0% up to the end of the addition were observed.

Solids content of the copolymer solution obtained: 43%
Average molecular weight: 27.000 g/mol.

Comparative Example 3-2

Synthesis example 3 was repeated analogously to Comparative example 3-1 with a linear metering rate of solution A.

However, the increase of the pH in the polymerization mixture which was observed in the first 7 minutes of the addition of A was corrected by addition of 25% strength sulphuric acid, and the subsequently observed decrease of the pH was corrected by addition of 20% strength sodium hydroxide solution, so that the measured pH in the reactor could be kept constant at 5.1.

Synthesis Example 4

100 g of demineralized water and 112.5 g (0.0375 mol) of vinyloxybutyl polyethylene glycol-3000 (adduct of 65 mol of ethylene oxide with hydroxybutyl monovinyl ether having an average molecular weight of 3000 g/mol) were initially introduced into a glass reactor equipped with a stirrer, pH electrode and a plurality of feed devices and were cooled to a polymerization starting temperature of 15° C. (initially introduced mixture).

16.2 g (0.2025 mol) of acrylic acid were homogeneously mixed with 42 g of demineralized water in a separate feed vessel. The solution was adjusted, with cooling, to a temperature of 20° C. and a pH of 4.0 with 7.7 g of a 40% strength potassium hydroxide solution. 0.7 g of 3-mercaptopropionic acid was then added as a molecular weight regulator (solution A1). In a second separate feed vessel, 100 g of demineralized water and 112.5 g (0.0375 mol) of vinyloxybutylpolyethylene glycol-3000 (adduct of 65 mol of ethylene oxide with hydroxybutyl monovinyl ether having an average molecular weight of 3000 g/mol) were mixed (solution A2).

At the same time, a second solution consisting of 1.5 g of Brüggolit FF6 (from Brüggemann GmbH) and 23.5 g of water was prepared (solution B).

23.3 g of solution A1 and then 1.8 g of a 20% strength aqueous sodium hydroxide solution were added to the initially introduced mixture with stirring and cooling so that a pH of 5.8 resulted.

After this pH had been reached, 0.015 g of iron(II) sulphate heptahydrate, 0.1 g of solution B and 0.94 g of hydrogen peroxide (30% in water) were added in succession to the initially introduced mixture. At the same time, the addition of solutions A1, A2 and B to the stirred and initially introduced mixture was started.

The feed rate of solution A1 was modified here according to the following metering profile so that the pH in the initially introduced mixture over the entire period of addition of 45 minutes was kept constant at a value of 5.8 +/−0.1:

| t (min) | 0 | 1.5 | 3 | 6 | 9 | 12 | 15 | 18 | 21 | 24 | 27 | 30 | 33 | 36 | 39 | 45 |
|---|---|---|---|---|---|---|---|---|---|---|---|---|---|---|---|---|
| Solution A1 (g/h) | 29 | 59 | 103 | 123 | 115 | 103 | 88 | 71 | 56 | 44 | 35 | 26 | 21 | 15 | 13 | 0 |

Solution A 2 was metered simultaneously according to the following metering profile from the separate initially introduced mixture:

| t (min) | 0 | 1.5 | 3 | 6 | 9 | 12 | 15 | 18 | 21 | 24 | 27 | 30 | 33 | 36 | 39 | 45 |
|---|---|---|---|---|---|---|---|---|---|---|---|---|---|---|---|---|
| Solution A2 (g/h) | 144 | 288 | 504 | 603 | 561 | 504 | 432 | 345 | 273 | 213 | 171 | 128 | 103 | 72 | 63 | 0 |

Solution B was added simultaneously over the same period of 45 minutes at a metering rate of 7 g/h. Thereafter, the metering rate of solution B was increased to 50 g/h and pumped into the initially introduced mixture over a period of 10 minutes with stirring. After complete addition of solutions A1, A2 and B, peroxide was no longer found in the reaction vessel.

The polymer solution obtained was then adjusted to a pH of 6.5 with about 11 g of a 20% strength sodium hydroxide solution.

The copolymer obtained occurred as slightly yellow solution which had a solids content of 46.3%. The average molecular weight of the copolymer was Mw 60000 g/mol; Mp 46000 g/mol; residual PEG: 12%; polydispersity 1.64.

Determination of the pH:

The pH of the aqueous medium (which is usually not present as an ideal solution—because organic components are usually also present in relatively high concentration in the aqueous medium in addition to water) is generally expediently measured using a glass electrode. In the experimental examples described above, the pH of the aqueous medium was based in each case on the measured quantity which is obtained by introducing a pH combination electrode of the type H 6381 from Schott AG (glass electrode) under the respective temperature and concentration conditions specified by the experiment described into the reaction mixture and outputting its generated signal by means of a multiparameter measuring instrument of the type ProfilLine Multi 197i from WTW as a number. The calibration of the abovementioned pH combination electrode is effected using commercially available pH buffer solutions (pH 4.00 and pH 7.00) as a function of the temperature.

Analysis of the Copolymers From the Synthesis and Comparative Examples:

The polymers from the synthesis examples and the comparative examples were analyzed by means of size exclusion chromatography with respect to average molar mass and conversion (column combination: OH-Pak SB-G, OH-Pak SB 804 HQ and OH-Pak SB 802.5 HQ from Shodex, Japan; eluent: aqueous solution of $HCO_2NH_4$ (0.05 mol/l) 80% by volume and acetonitrile 20% by volume; injection volume 100 µl; flow rate 0.5 ml/min). The calibration for the determination of the average molar mass was effected using linear poly(ethylene oxide) and polyethylene glycol standards. As a measure of the conversion, the peak of the copolymer is standardized to a relative height of 1 and the height of the peak of the unconverted macromonomer/PEG-containing oligomer is used as a measure of the content of residual monomer.

Use Examples of the Copolymers from the Synthesis Examples and Comparative Examples:

The polymers from the synthesis examples and the comparative examples were investigated with regard to their properties as concrete superplasticizers in a suitable test system. For this purpose, all polymers were adjusted to a uniform solids content and uniform pH of 6.5±0.2 with NaOH in water (30% by weight) and small amounts of a conventional antifoam were added for controlling the air pore content.

Use Example 1

First, 7.00 kg of a Portland cement (Karlstadt CEM I 42.5 R), 2 kg of a K-S flour Füller's calcite MS 12 and furthermore 5.45 kg of quartz sand (0/0.5 and 0/1.0), 16.98 kg of sand 0/4, 5.65 kg of gravel 4/8 and 18.60 kg of gravel 8/16 were combined and were dried and blended for 10 seconds. Thereafter, 0.5 kg of initially introduced water were added and mixing was effected for a further 120 seconds. Thereafter, 3.61 kg of remaining water were added and mixing was effected for a further 60 seconds. Thereafter, in each case $7.70 \cdot 10^{-3}$ kg (calculated on the basis of 100%) of polymer (based on the polymer solids content) was added and mixing was effected for a further 60 seconds (corresponds to a water/cement ratio of 0.59 and a polymer dose of 0.11% of solids, based on the amount of cement weighed in). The consistency according to DIN EN 12350-5 was then determined directly after the preparation and after 10, 30 and 60 minutes. The following values were determined:

|  | Slump (cm) after x min. | | | | Consistency (cm) after x min. | | | |
|---|---|---|---|---|---|---|---|---|
| Polymer from | 0 | 10 | 30 | 60 | 0 | 10 | 30 | 60 |
| Synthesis example 1 | 24 | 24 | 23 | 22 | 66 | 66 | 62.5 | 58.5 |
| Synthesis example 4 | 23 | 23 | 23 | 22 | 64 | 63 | 61.5 | 59.5 |
| Comp. example 1-1 | 20 | 22 | 21 | 16 | 57 | 60.5 | 56.5 | 47.5 |
| Comp. example 1-2 | 22 | 21 | 19 | 18 | 59 | 55 | 53 | 48.5 |

Use Example 2

The procedure was as described in Use Example 1, but the mixture was adapted as follows:

| | |
|---|---|
| Cement Allmendingen CEM I 42.5 R | 7.00 kg |
| K-S flour Füller's calcite MS 12 | 2.00 kg |
| Quartz sand (0/0.5 and 0/1.0) | 5.57 kg |
| Sand 0/4 | 17.06 kg |
| Gravel 4/8 | 4.29 kg |
| Gravel 8/16 | 18.60 kg |
| Initially introduced water | 0.5 kg |
| Remaining water | 3.46 kg |
| Polymer (100%) | 0.0133 kg |

This gave a water/cement ratio of 0.57 and a superplasticizer dose of 0.19% (polymer solids, based on cement):

|  | Slump (cm) after x min. | | | | Consistency (cm) after x min. | | | |
|---|---|---|---|---|---|---|---|---|
| Polymer | 0 | 10 | 30 | 60 | 0 | 10 | 30 | 60 |
| Synthesis example 2 | 22 | 22 | 21 | 21 | 60.5 | 60.5 | 57.5 | 56.5 |
| Comp. example 2-1 | 19.5 | 20.5 | 20 | 18 | 55 | 56.5 | 55.5 | 50 |
| Comp. example 2-2 | 22 | 21 | 20 | 19 | 59.5 | 57.5 | 55 | 54.5 |

Use Example 3

The procedure was as described in Use Example 1 but the mixture was adapted as follows:

| | |
|---|---|
| Portland cement Karlstadt CEM I 42.5 R | 7.00 kg |
| K-S flour Füller's calcite MS 12 | 2.00 kg |
| Quartz sand (0/0.5 and 0/1.0) | 5.47 kg |
| Sand 0/4 | 17.05 kg |
| Gravel 4/8 | 5.67 kg |
| Gravel 8/16 | 18.68 kg |
| Initially introduced water | 0.5 kg |
| Remaining water | 3.53 kg |
| Polymer (100%) | 0.0126 kg |

This gives a water/cement value of 0.58 and a superplasticizer dose of 0.18% (solids, based on cement weight):

|  | Slump (cm) after x min. | | | | Consistency (cm) after x min. | | | |
|---|---|---|---|---|---|---|---|---|
| Polymer | 0 | 10 | 30 | 60 | 0 | 10 | 30 | 60 |
| Synthesis example 3 | 23 | 22.5 | 21 | 20 | 63.5 | 62 | 59.5 | 57.5 |
| Comp. example 3-1 | 15 | 20.5 | 18 | 17.5 | 46.5 | 58 | 51 | 49.5 |
| Comp. example 3-2 | 22 | 21 | 19 | 18 | 59 | 57 | 50.5 | 48.5 |

The polymers prepared according to the invention show better plasticizing effects (water reduction) in the same dose directly after preparation of the concrete in comparison with the reference products. Furthermore, they have neither subsequent plasticization undesired for the user nor a marked loss of processability, i.e. the performance characteristics essential for the concrete manufacturer as the user of the products are substantially improved in the case of the polymers according to the invention.

The invention claimed is:

1. A process for preparing a copolymer in a semicontinuous mode of operation in a polymerization apparatus containing a polymerization reactor connected to a metering device, the process comprising:

(a) initially introducing acid monomer into the metering device and initially introducing polyether macromonomer and water into the polymerization reactor, (b) metering the acid monomer from the metering device into the polymerization reactor, (c) passing free radical polymerization initiator into the polymerization reactor before and/or during the metering of the acid monomer into the polymerization reactor, wherein an aqueous medium forms in the polymerization reactor, and wherein the acid monomer and the polyether macromonomer are reacted in the aqueous medium by free radical polymerization forming the copolymer, at least 70 mol % of the polyether macromonomer initially introduced into the polymerization reactor being converted by the free radical polymerization, the conversion of the acid monomer produces in the copolymer an acid structural unit which reduces the pH of the aqueous medium less than does the acid monomer, wherein the metering of the acid monomer into the polymerization reactor first establishes an initial polymerization pH in the aqueous medium and then, until the conversion of 70 mol % of the polyether macromonomer initially introduced into the polymerization reactor, the metering of the acid monomer into the polymerization reactor at a metering rate that causes the pH in the aqueous medium to deviate by not more than ±0.3 from the initially established polymerization pH.

2. The process according to claim 1, wherein the reaction of the acid monmormer produces a structural unit in the copolymer which is according to at least one of the general formulae (Ia), (Ib), (Ic) and/or (Id)

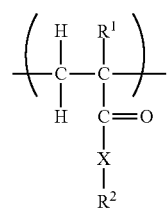
(Ia)

where
R$^1$ is identical or different and is represented by H and/or a straight-chain or branched C$_1$-C$_4$ alkyl group;
X is identical or different and is represented by NH—(C$_n$H$_{2n}$) where n=1, 2, 3 or 4 and/or O—(C$_n$H$_{2n}$)where n=1, 2, 3 or 4 and/or by a unit not present;
R$^2$ is identical or different and represented by OH, SO$_3$H, PO$_3$H$_2$, O—PO$_3$H$_2$ and/or para-substituted C$_6$H$_4$—SO$_3$H, with the proviso that, if X is a unit not present, R$^2$ is represented by OH;

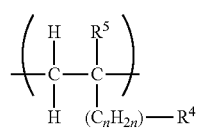
(Ib)

where
R$^3$ is identical or different and is represented by H and/or a straight-chain or branched C$_1$-C$_4$ alkyl group;
n=0, 1, 2, 3 or 4;
R$^4$ is identical or diffferent and is represented by SO$_3$H, PO$_3$H$_2$, O—PO$_3$H$_2$and/or C$_6$H$_4$—SO$_3$H present in para-subsituted form;

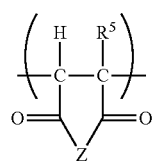
(Ic)

where
R$^5$ is identical or different and is represented by H and/or a straight-chain or branched C$_1$-C$_4$ alkyl group;
Z is identical or different and is represented by O and/or NH;

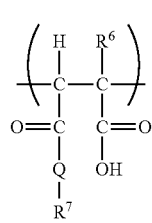
(Id)

where
R$^6$ is identical or different and is represented by H and/or a straight-chain or branched C$_1$-C$_4$ alkyl group:
Q is identical or different and is represented by NH and/or O;
R$^7$ is identical or different and is represented by H, (C$_n$H$_{2n}$)—SO$_3$H where n=0, 1, 2, 3 or 4, (C$_n$H$_{2n}$)—OH where n=0, 1, 2, 3 or 4; (C$_n$H$_{2n}$)—PO$_3$H$_2$ where n=0, 1, 2, 3 or 4, (C$_n$H$_{2n}$)—OPO$_3$H$_2$ where n=0, 1, 2, 3 or 4, (C$_6$H$_4$)—SO$_3$H, (C$_6$H$_4$)—PO$_3$H$_2$, (C$_6$H$_4$)—OPO$_3$H$_2$ and/or (C$_m$H$_{2m}$)$_c$—O-(A'O)$_a$—R$^9$where m=0, 1, 2, 3 or 4, c=0, 1, 2, 3 or 4, A'=C$_x$H$_{2x}$ where x'=2, 3, 4 or 5 and/or CH$_2$C(C$_6$H$_5$)H—, α=an integer from 1 to 350 with R$^9$ identical or diffrent and represented by a straight-chain or branched C$_1$-C$_4$ alkyl group.

3. The process according to claim 1,wherein the acid monomer is methacrylic acid, acrylic acid, maleic acid, maleic anhydride, a monoester of maleic acid or a mixture of a plurality of said acid monomers.

4. The process according to claim 1, wherein the reaction of the polyether macromonomer produces a structural unit in the copolymer which is according to at least one of the general formulae (IIa), (IIb) and/or (IIc)

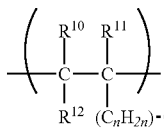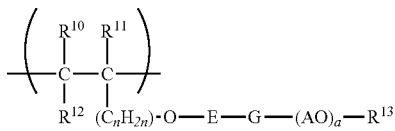
(IIa)

where
R$^{10}$, R$^{11}$ and R$^{12}$ are in each case identical or different and, independently of one another, are represented by H and/or a straight-chain or branched C$_1$-C$_4$ alkyl group:
E is identical or different and is represented by a straight-chain or branched C$_1$-C$_6$ alkylene group, a cyclohexyl group, CH$_2$—C$_6$H$_{10}$, C$_6$H$_4$ present in ortho-, meta- or para-substituted from and/or a unit not present;
G is identical or different and is represented by O, NH and/or CO—NH, with the proviso that, if E is a unit not present, G is also a unit not present;
A is identical or different and is represented by C$_x$H$_{2x}$ where x=2, 3, 4 and/or 5 and/or CH$_2$CH(C$_6$H$_5$);
n is identical or different and is represented by 0, 1, 2, 3, 4 and/or 5;
a is identical or different and is represented by an integer from 2 to 350;
R$^{13}$ is identical or different and is represented by H, a straight-chain or branched C$_1$-C$_4$ alkyl group, CO—NH$_2$, and/or COCH$_3$;

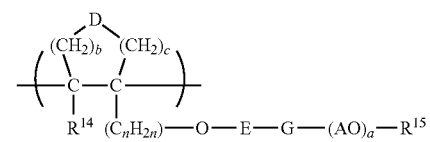
(IIb)

where
R$^{14}$ is identical or different and is represented by H and/or a straight-chain or branched C$_1$-C$_4$ alkyl group;
E is identical or different and is represented by a straight-chain or branched C$_1$-C$_6$ alkylene group, a cyclohexyl group, $CH_2$—$C_6H_{10}$, $C_6H_4$ present in ortho-, meta- or para-substituted form and/or by a unit not present;

G is identical or different and is represented by a unit not present, O, NH and/or CO—NH, with the proviso that, if E is a unit not present, G is also a unit not present;

A is identical or different and is represented by $C_xH_{2x}$ where x=2, 3, 4 and/or 5 and/or $CH_2CH(C_6H_5)$;

n is identical or different and is represented by 0, 1, 2, 3, 4 and/or 5;

a is identical or different and is represented by an integer from 2 to 350;

D is identical or different and is represented by a unit not present, NH and/or O, with the proviso that, if D is a unit not present; b=0, 1, 2, 3 or 4 and c=0, 1, 2, 3 or 4, where b+c=3 or 4 and with the proviso that if D is NH and/or O; b=0, 1, 2 or 3, c=0, 1, 2 or 3, where b=c+2 or 3;

$R^{15}$ is identical or different and is represented by H, a straight-chain or branched $C_1$-$C_4$ alkyl group, CO—$NH_2$, and/or $COCH_3$;

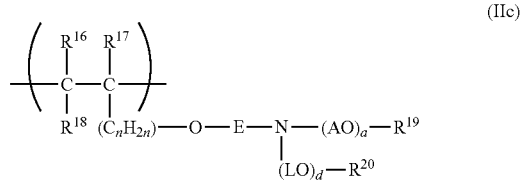
(IIc)

where $R^{16}$, $R^{17}$ and $R^{18}$ are in each case identical or different and, independently of one another are represented by H and/or a straight-chain or branched $C_1$-$C_4$ alkyl group;

E is identical or different and is represented by a straight-chain or branched $C_1$-$C_6$ alkylene group, a cyclohexyl group, $CH_2$—$C_6H_4$ present in ortho-, meta- or para-substituted form and/or by a unit not present;

A is identical or different and is represented by $C_xH_{2x}$ where x=2, 3, 4 and/or 5 and/or $CH_2CH(C_6H_5)$;

n is identical or different and is represented by 0, 1, 2, 3, 4 and/or 5;

L is identical or different and is represented by $C_xH_{2x}$ where x=2, 3, 4 and/or 5 and/or $CH_2$—$CH(C_6H_5)$;

a is identical or different and is represented by an integer from 2 to 350;

d is identical or different and is represented by an integer from 1 to 350;

$R^{19}$ is identical or different and is represented by H and/or a straight-chain or branched $C_1$-$C_4$ alkyl group;

$R^{20}$ is identical or different and is represented by H and/or a straight-chain $C_1$-$C_4$ alkyl group.

5. The process according to claim 1, wherein the polyether macromonomer is isoprenol, alkoxylated hydroxybutyl vinyl ether, alkoxylated (meth)allyl alcohol, vinylated methyl polyalkylene glycol or mixtures thereof, having optionally in each case an arithmetic mean number of oxyalkylene groups of 4 to 340.

6. The process according to claim 1, wherein a vinylically unsaturated compound is introduced into the polymerization reactor as a monomeric starting material, which compound is reacted by polymerization and thereby produces a structural unit in the copolymer which is present according to the general formula (IIIa) and/or (IIIb)

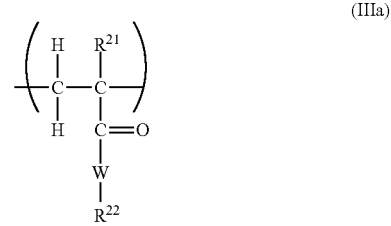
(IIIa)

where $R^{21}$ is identical or different and is represented by H and/or a straight-chain or branched $C_1$-$C_4$ alkyl group;

W is identical or different and is represented by O and/or NH;

$R^{22}$ is identical or different and is represented by a straight-chain or branched $C_1$-$C_5$ monohydroxyalkyl group;

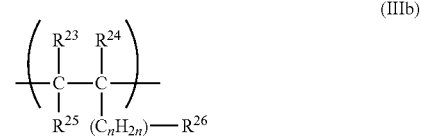
(IIIb)

where $R^{23}$, $R^{24}$ and $R^{25}$ are in each case identical or different and, in each case independently, are represented by H and/or a straight-chain or branched $C_1$-$C_4$ alkyl group;

n is identical or different and is represented by 0, 1, 2, 3 and/or 4;

$R^{26}$ is identical or different and is represented by ($C_6H_5$), OH and/or —$COCH_3$.

7. The process according to claim 1, wherein a redox initiator system is used as the free radical polymerization initiator.

8. The process according to claim 7, wherein the redox initiator system comprises the combination $H_2O_2$/$FeSO_4$ together with a reducing agent.

9. The process according to claim 8, wherein the reducing agent is disodium salt of 2-hydroxy-2-sulphinatoacetic acid, disodium salt of 2-hydroxy-2-sulphonatoacetic acid, sodium hydroxymethanesulphinate, ascorbic acid, isoascorbic acid or mixtures thereof.

10. The process according to claim 8, comprising passing a component of the redox initiator system and/or reducing agent into the polymerization reactor after the polymerization pH has been established and while metering in the acid monomer.

11. The process according to claim 1, wherein the polymerization pH in the aqueous medium is established so that, based on the free radical polymerization initiator used, the free radical formation per unit time is maximum.

12. The process according to claim 1, wherein the aqueous medium is comprises an aqueous solution.

13. The process according to claim 1, wherein the polymerization reactor comprises a semicontinuous stirred tank.

14. The process according to claim 1, wherein at least 80 mol % of the polyether macromonomer initially introduced into the polymerization reactor is converted by the free radical polymerization.

15. The process according to claim 1, wherein up to a conversion of 70 mol % of the polyether macromonomer initially introduced into the polymerization reactor, the metering of the acid monomer into the polymerization reactor in an amount per unit time that the pH in the aqueous medium to deviate by not more than ±0.2 from the initially established polymerization pH.

16. The process according to claim 1, wherein at least 80 mol % of the polyether macromonomer initially introduced into the polymerization reactor is converted by the free radical polymerization, and wherein until conversion of 80 mol % of the polyether macromonomer initially introduced into the polymerization reactor, the metering of the acid monomer into the polymerization reactor in an amount per unit time causes that the pH in the aqueous medium to deviate by not more than ±0.3 from the initially established polymerization pH.

17. The process according to claim 1, wherein the polymerization pH is 4.0 to 7.0, and the temperature of the aqueous medium during the free radical polymerization is 0 to 90° C.

18. The process according to claim 1, wherein the acid monomer is initially introduced together with water into the metering unit and an aqueous solution of the acid monomer is metered from the metering device into the polymerization reactor, a portion of the acid monomer capable of being converted into the corresponding acid monomer salt by addition of base before being metered into the polymerization reactor.

19. The process according to claim 1, wherein the polymerization pH in the aqueous medium is established by metering the acid monomer into the polymerization reactor and adding a base to the polymerization reactor and/or to the metering device, so that acid monomer and/or acid monomer salt is already present in the polymerization reactor before the polymerization pH established.

20. The process according to claim 1, wherein polyether macromonomer is initially introduced into the polymerization reactor in an amount per mole of acid monomer metered in, such that an arithmetic mean molar ratio of acid monomer structural units to polyether macromonomer structural units of 20:1 to 1:1 is established in the copolymer formed.

21. The process according to claim 1, wherein at least 45 mol % of all structural units of the copolymer are produced by the free radical polymerization of the acid monomer and the polyether macromonomer.

22. The process according to claim 1, comprising passing a chain regulator, which is optionally in dissolved form, into the polymerization reactor.

23. A copolymer prepared by the process according to claim 1.

24. Process for using the copolymer according to claim 23 as a dispersant for hydraulic binders or for latent hydraulic binders, comprising adding the copolymer to a mixture comprising water and at least one of the hydraulic binders or latent hydraulic binders, and mixing.

25. The process according to claim 1, wherein the polymerization pH is 5.1 to 6.5, and the temperature of the aqueous medium during the free radical polymerization is 0 to 90° C.

* * * * *